US010202806B2

(12) United States Patent
Valliyappan et al.

(10) Patent No.: US 10,202,806 B2
(45) Date of Patent: Feb. 12, 2019

(54) BEARING ASSEMBLY FOR A DRILLING TOOL

(71) Applicant: SMITH INTERNATIONAL, INC., Houston, TX (US)

(72) Inventors: Somasundaram Valliyappan, Spring, TX (US); Kenneth M. Nevlud, Houston, TX (US)

(73) Assignee: SMITH INTERNATIONAL, INC., Houston, TX (US)

( * ) Notice: Subject to any disclaimer, the term of this patent is extended or adjusted under 35 U.S.C. 154(b) by 365 days.

(21) Appl. No.: 14/890,440

(22) PCT Filed: May 13, 2014

(86) PCT No.: PCT/US2014/037831
§ 371 (c)(1),
(2) Date: Nov. 11, 2015

(87) PCT Pub. No.: WO2014/186354
PCT Pub. Date: Nov. 20, 2014

(65) Prior Publication Data
US 2016/0108675 A1    Apr. 21, 2016

Related U.S. Application Data

(60) Provisional application No. 61/824,877, filed on May 17, 2013.

(51) Int. Cl.
E21B 4/00 (2006.01)
F16C 17/04 (2006.01)
E21B 4/02 (2006.01)

(52) U.S. Cl.
CPC ............... *E21B 4/003* (2013.01); *E21B 4/02* (2013.01); *F16C 17/04* (2013.01); *F16C 2352/00* (2013.01)

(58) Field of Classification Search
CPC ............... E21B 4/003; E21B 4/02; E21B 4/00
See application file for complete search history.

(56) References Cited

U.S. PATENT DOCUMENTS

| 4,386,666 A | 6/1983 | Crase et al. | |
| 4,511,193 A * | 4/1985 | Geczy | E21B 4/003 384/611 |
| 4,560,014 A | 12/1985 | Geczy | |
| 4,732,491 A | 5/1988 | Geczy | |

(Continued)

OTHER PUBLICATIONS

International Search Report and Written Opinion issued in PCT/US2014/037831 dated Sep. 1, 2014; 13 pages.

Primary Examiner — David J Bagnell
Assistant Examiner — Tara E Schimpf

(57) ABSTRACT

A bearing assembly for a drilling tool. A thrust bearing assembly for use in a drilling tool may include a first thrust frame having a generally cylindrical hollow body with a first inner surface, where the first thrust frame includes: (i) first flow diverters protruding laterally from the first inner surface toward a longitudinal axis of the thrust bearing assembly and (ii) first flow ports formed along the first inner surface between adjacent first flow diverters. The thrust bearing assembly may also include a stationary thrust bearing having a generally cylindrical base with legs extending in an axial direction from the base, where the legs may be generally positioned within the first flow ports.

20 Claims, 9 Drawing Sheets

(56) References Cited

U.S. PATENT DOCUMENTS

| | | | |
|---|---|---|---|
| 4,764,036 | A | 8/1988 | McPherson |
| 5,037,212 | A | 8/1991 | Justman et al. |
| 7,785,012 | B2 | 8/2010 | Lee et al. |
| 2009/0272581 | A1 | 11/2009 | Beylotte et al. |
| 2010/0166578 | A1 | 7/2010 | Watson |
| 2012/0205158 | A1 | 8/2012 | Barnes et al. |
| 2012/0285748 | A1 | 11/2012 | Kirkhope |
| 2012/0288226 | A1 | 11/2012 | Konde et al. |
| 2013/0016935 | A1* | 1/2013 | Cooley .................. E21B 4/003 384/420 |

* cited by examiner

BEARING ASSEMBLY FOR A DRILLING TOOL

CROSS-REFERENCE TO RELATED APPLICATIONS

This application claims priority to U.S. Provisional Application 61/824,877 filed May 17, 2013, the entirety of which is incorporated by reference.

FIELD OF THE INVENTION

Aspects of the disclosure relate to oil field service applications. More specifically, aspects of the disclosure relate to a bearing assembly for a drilling tool.

BACKGROUND

Drilling tools, such as drilling motors, may be used to provide rotational force to a drill bit when drilling earth formations. Drilling motors used for this purpose may be driven by drilling fluids pumped from surface equipment through a drill string. This type of motor may be referred to as a mud motor. In use, the drilling fluid may be forced through the mud motor, which may extract energy from the flow to provide rotational force to a drill bit located below the mud motor. A mud motor may include a positive displacement motor (PDM) or a turbodrill.

In one scenario, a turbodrill may use turbine stages to provide rotational force to a drill bit. The turbine stages may consist of one or more non-moving stator vanes and a rotor assembly having rotating vanes mechanically linked to a shaft. The turbine stages may be designed such that the vanes of the stator stages direct the flow of drilling fluid into corresponding rotor blades to provide rotation to the shaft, where the shaft ultimately connects to and drives the drill bit. Thus, the high-speed drilling fluid flowing into the rotor vanes may cause the rotor and the drill bit to rotate with respect to a housing.

While providing rotational force to the shaft, the turbine stages may also produce a downhole axial force, or thrust, from the drilling fluid. The downhole thrust, however, may produce a higher weight on bit (WOB) than appropriate for operation of the turbodrill. To mitigate the effects of excess thrust in the turbodrill, thrust bearings may be provided.

SUMMARY

Described herein are implementations of various technologies for a bearing assembly for a drilling tool. In one implementation, a thrust bearing assembly for use in a drilling tool may include a first thrust frame having a generally cylindrical hollow body with a first inner surface, where the first thrust frame includes: (i) first flow diverters protruding laterally from the first inner surface toward a longitudinal axis of the thrust bearing assembly and (ii) first flow ports formed along the first inner surface between adjacent first flow diverters. The thrust bearing assembly may also include a stationary thrust bearing having a generally cylindrical base with legs extending in an axial direction from the base, where the legs may be generally positioned within the first flow ports.

Described herein are implementations of various technologies for a frame assembly for use in a drilling tool. In one implementation, the frame assembly may include a first frame having a generally cylindrical hollow body with a first end portion and a second end portion, first alignment tabs arranged in a predetermined arrangement and protruding in an axial direction beyond the first end portion, and second alignment tabs arranged in the predetermined arrangement and protruding in the axial direction beyond the second end portion. The frame assembly may also include a second frame having a generally cylindrical hollow body with a third end portion and a fourth end portion, third alignment tabs arranged in the predetermined arrangement and protruding in an axial direction beyond the third end portion, and fourth alignment tabs arranged in the predetermined arrangement and protruding in the axial direction beyond the fourth end portion. In addition, the first alignment tabs may couple with the third alignment tabs or the fourth alignment tabs, and the second alignment tabs may couple with the third alignment tabs or the fourth alignment tabs.

Described herein are implementations of various technologies for a turbodrill, which may include a housing having a bore extending throughout the housing. The turbodrill may also include a rotatable shaft positioned in the housing bore, where the shaft is rotatable relative to the housing, and where the housing, the housing bore and the rotatable shaft have a common longitudinal axis. The turbodrill may further include a hydraulic thrust bearing assembly which may allow the rotatable shaft to pass through it. The hydraulic thrust bearing assembly may include a first thrust frame having a generally cylindrical hollow body with a first inner surface, where the first thrust frame includes: (i) first flow diverters protruding laterally from the first inner surface toward the common longitudinal axis of the thrust bearing assembly and (ii) first flow ports formed along the first inner surface between adjacent first flow diverters. The hydraulic thrust bearing assembly may also include a stationary thrust bearing having a generally cylindrical base with legs extending in an axial direction from the base, where the legs may be generally positioned within the first flow ports. The hydraulic thrust bearing assembly may further include a second thrust frame having a generally cylindrical hollow body with a second inner surface and coupled to the first thrust frame, where the second thrust frame includes: (i) second flow diverters protruding laterally from the second inner surface toward the common longitudinal axis and (ii) second flow ports formed along the second inner surface between adjacent second flow diverters, where the stationary thrust bearing is positioned inside the first thrust frame and the second thrust frame. In addition, the hydraulic thrust bearing assembly may include a rotating thrust bearing rotatably coupled to the shaft and disposed on the legs of the stationary thrust bearing.

The above referenced summary section is provided to introduce a selection of concepts in a simplified form that are further described below in the detailed description section. The summary is not intended to be used to limit the scope of the claimed subject matter. Furthermore, the claimed subject matter is not limited to implementations that solve disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate various implementations described herein and are not meant to limit the scope of various techniques described herein.

DETAILED DESCRIPTION

Figure 1:
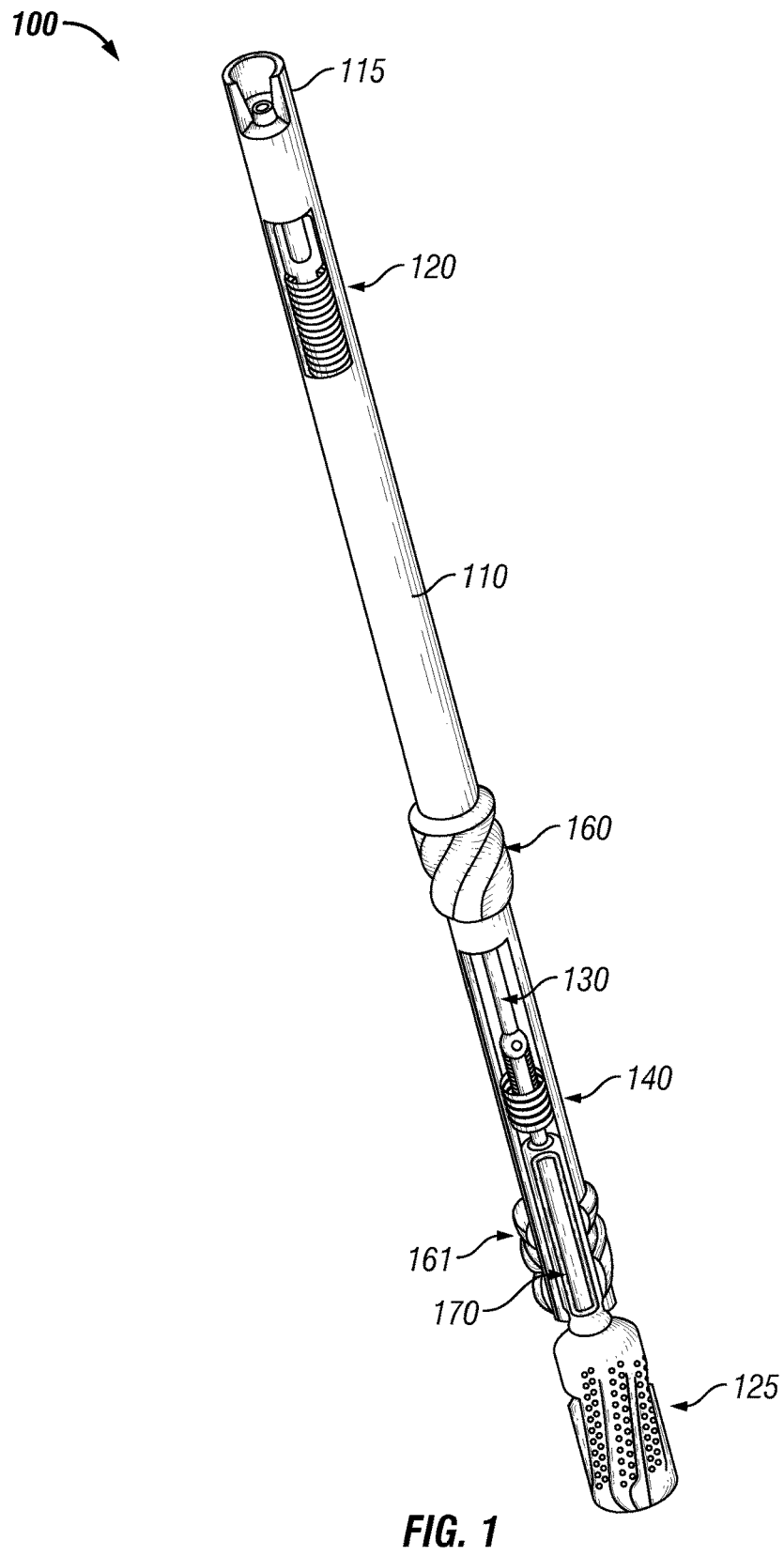
FIG. 1 illustrates a view of a turbodrill in connection with implementations of various techniques described herein.

The discussion below is directed to certain specific implementations. It is to be understood that the discussion below is for the purpose of enabling a person with ordinary skill in the art to make and use any subject matter defined now or later by the patent "claims" found in any issued patent herein.

It is specifically intended that the claims not be limited to the implementations and illustrations contained herein, but include modified forms of those implementations including portions of the implementations and combinations of elements of different implementations as come within the scope of the following claims.

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the claims. The first object and the second object are both objects, respectively, but they are not to be considered the same object.

The terminology used in the description of the present disclosure herein is for the purpose of describing particular implementations and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses one or more possible combinations of one or more of the associated listed items. It will be further understood that the terms "includes" and/or "including," when used in this specification, specify the presence of stated features, integers, operations, elements, and/or components, but do not preclude the presence or addition of one or more other features, integers, operations, elements, components and/or groups thereof.

As used herein, the terms "up" and "down;" "upper" and "lower;" "upwardly" and downwardly;" "below" and "above;" and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

The following paragraphs provide a brief summary of various technologies and techniques directed at a bearing assembly for a drilling tool described herein.

To mitigate the effects of excess thrust in the turbodrill, one or more thrust bearing assemblies may be provided. For example, a hydraulic thrust bearing assembly may be used to mitigate effects of downhole thrust, and a mechanical thrust bearing assembly may be used to mitigate effects of uphole thrust. In one implementation, the thrust bearing assembly may include a stationary thrust bearing, a rotating thrust bearing, and a first thrust frame configured to couple to a second thrust frame. The thrust bearing assembly may be configured such that the stationary thrust bearing, spacers and a spring mechanism are disposed within a combination of the first thrust frame and the second thrust frame.

The first thrust frame may have a generally cylindrical body with an inner surface. The first thrust frame may include a plurality of flow diverters extending generally laterally from the inner surface toward a longitudinal axis. Each flow diverter may run along the inner surface in a manner that is parallel to the longitudinal axis, and have a flat end portion and a sloped end portion. The end portion of the first thrust frame proximate to the flat end portion may be referred to as the seating end portion, and the end portion of the first thrust frame proximate to the sloped end portion may be referred to as the flowing end portion.

A plurality of flow ports may be formed along the inner surface of the first thrust frame, where each flow port may be formed between a pair of adjacent flow diverters. The flow ports may be configured to allow drilling fluid to flow between the flow diverters. The first thrust frame and the second thrust frame may be identical to one another. When coupled together, the flow ports may be aligned such that drilling fluid may be generally unobstructed as it passes between the first thrust frame and the second thrust frame.

The first thrust frame may use a plurality of alignment tabs and the second thrust frame may use a plurality of alignment tabs to couple with each other. The alignment tabs may engage with one another to prevent rotation of either the first thrust frame or the second thrust frame with respect to the other.

The stationary thrust bearing may include a base portion, a tungsten carbide substrate, a diamond table and a plurality of legs. In one implementation, the legs and the base portion may be composed of steel. The stationary thrust bearing may be at least partially disposed in the first thrust frame such that the legs may be configured to engage with the flow ports. In particular, rotation of the stationary thrust bearing may be prevented by frictional engagement of the legs with the flow diverters. In one implementation, a resting side of the stationary thrust bearing may be disposed on a combination of one or more spacers and/or one or more spring mechanisms. The combination of spacers and spring mechanisms may be disposed on one or more of the flat end portions of the flow diverters of the second thrust frame.

In one implementation, the rotating thrust bearing may be at least partially positioned within the first thrust frame and configured to mate with the stationary thrust bearing. In particular, the rotating thrust bearing may include a diamond table which may be configured to mate with the diamond table of the stationary thrust bearing.

Various implementations described above will now be described in more detail with reference to FIGS. 1-12. The following implementations focus primarily on turbodrills. However, those skilled in the art will appreciate that bearing assemblies as disclosed herein may be similarly used in other drilling tools, such as a positive displacement motor (PDM).

Turbodrill

FIG. 1 illustrates a view of a turbodrill 100 in connection with implementations of various techniques described herein. The turbodrill 100 includes a housing 110, which includes an uphole connection 115 to couple to a drill string. Turbine stages 120 are disposed within the housing 110 and may be used to rotate a shaft 130. At a downhole end portion of the turbodrill 100, a drill bit 125 may be attached to the shaft 130 by a downhole connection (not shown). In addition, stabilizers 160 and 161 may be disposed on the housing 110 to help keep the turbodrill 100 centered within a wellbore.

The turbodrill 100 may use the turbine stages 120 to provide rotational force to the drill bit 125. The turbine stages 120 may consist of one or more non-moving stator blades and a rotor assembly having rotating blades mechanically linked to the shaft 130. The turbine stages 120 may be designed such that the blades of the stator stages may direct drilling fluid into corresponding rotor blades to provide rotation to the shaft 130, where the shaft 130 ultimately couples to and drives the drill bit 125. Thus, the high-speed drilling fluid flowing into the rotor blades may cause the shaft 130 and the drill bit 125 to rotate with respect to the housing 110. A portion of the turbodrill 100 in which the turbine stages 120 are located may be called a power section, which may also include other components used to drive the drill bit 125.

While providing rotational force to the shaft 130, the turbine stages 120 may also produce a downhole axial force, or thrust, from the drilling fluid. The downhole thrust, however, may produce a higher weight on bit (WOB) than is needed for operation of the turbodrill 100. Uphole axial thrust may also result from reactionary forces of the drill bit 125. To mitigate the effects of excess thrust in the turbodrill 100, one or more thrust bearing assemblies 140 may be provided. For example, a hydraulic thrust bearing assembly may be used to mitigate effects of downhole thrust, and a mechanical thrust bearing assembly may be used to mitigate effects of uphole thrust.

A portion of the turbodrill 100 in which the thrust bearing assemblies 140 are located may be called a bearing section. The bearing section may also include bent housing and bearings used to mitigate excess load. The bearing section may be located downhole relative to the power section. In one implementation, the bearing section may include multiple thrust bearing assemblies 140 stacked in series. Each thrust bearing assembly 140 may include a rotating thrust bearing and a stationary thrust bearing. The thrust bearing assemblies 140 may be held in position in the turbodrill 100 by axial compression. In particular, stator components of the turbodrill 100, including the stationary thrust bearing, may be held stationary against the housing 110 by stator compression. In addition, rotor components of the turbodrill 100, including the rotating thrust bearing, may be fixed to the shaft 130 by rotor compression. The stator compression may be maintained by threaded components on one or both end portions of the housing 110, and the rotor compression may be similarly maintained by threaded components on one or both end portions of the shaft 130.

In operation, the thrust generated by rotor components of the turbodrill 100, such as the turbine stages 120, may be transferred to the rotating thrust bearing through the shaft 130. The thrust may then be transferred to the stationary thrust bearing, which may transfer the thrust to the housing 110. Consequently, the shaft 130 may be protected from taking a full amount of the thrust.

In one implementation, though the thrust bearing assemblies 140 may be in series, the thrust, at least in principle, may be carried in parallel by the thrust bearing assemblies 140 and shared to some extent by each thrust bearing assembly 140. Each thrust bearing assembly 140 may be of a substantially identical length, such that the thrust may be distributed evenly among the thrust bearing assemblies.

Thrust Bearing Assembly

Figure 2:
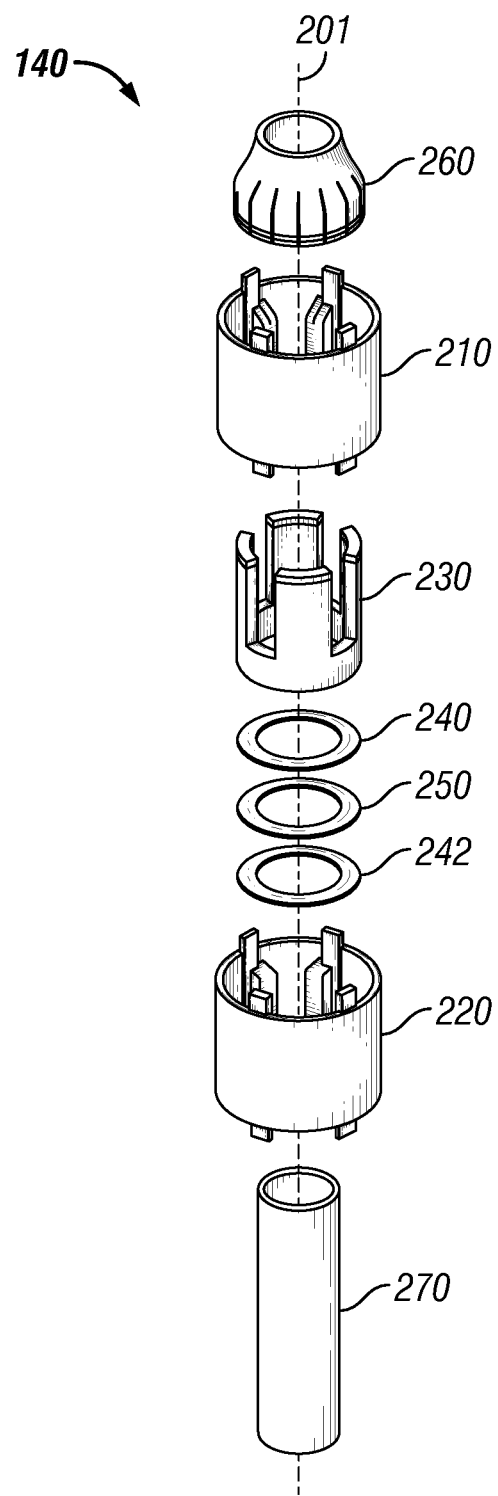
FIG. 2 illustrates an exploded view of a thrust bearing assembly in accordance with implementations of various techniques described herein.

FIG. 2 illustrates an exploded view of a thrust bearing assembly 140 in accordance with implementations of various techniques described herein. The thrust bearing assembly 140 may include a stationary thrust bearing 230, a rotating thrust bearing 260, and a first thrust frame 210 configured to couple to a second thrust frame 220. The thrust bearing assembly may also include spacers 240 and 242, a spring mechanism 250 and a rotor spacer 270 (170 in FIG. 1).

The thrust bearing assembly 140 may be configured such that the stationary thrust bearing 230, the spacer 240 and 242, and the spring mechanism 250 may be disposed within a combination of the first thrust frame 210 and the second thrust frame 220. The first thrust frame 210 and the second thrust frame 220 may be configured to frictionally engage an inner wall or surface of the housing 110 (not shown) through stator compression, as discussed above, such that the first thrust frame 210 and the second thrust frame 220 may be substantially stationary relative to the housing 110. In particular, the effect of stator compression may prevent the first thrust frame 210 and the second thrust frame 220 from rotating relative to the housing 110. In addition, as discussed with respect to FIG. 8, the stationary thrust bearing 230 may be prevented from rotating within the first thrust frame 210 and the second thrust frame 220.

The rotating thrust bearing 260 and the rotor spacer 270 may be coupled or mounted to the shaft 130 (not shown) via rotor compression, as discussed above, such that the rotating thrust bearing 260, the rotor spacer 270, and the shaft 130 may rotate together. In one implementation, the rotating thrust bearing 260 may be at least partially positioned within the first thrust frame 210 and configured to mate with the stationary thrust bearing 230. The stationary thrust bearing 230, the rotating thrust bearing 260, the first thrust frame 210, the second thrust frame 220, the spacers 240 and 242, the spring mechanism 250, and the rotor spacer 270 may be configured to allow the shaft 130 to pass through.

In a hydraulic thrust bearing arrangement, the thrust bearing assembly 140 may be oriented such that the rotating thrust bearing 260 is positioned uphole relative to the stationary thrust bearing 230. Comparatively, in a mechanical thrust bearing arrangement, the thrust bearing assembly 140 may be oriented in an opposite direction, such that the rotating thrust bearing 260 is positioned downhole relative to the stationary thrust bearing 230.

Thrust Frames

Figure 3:
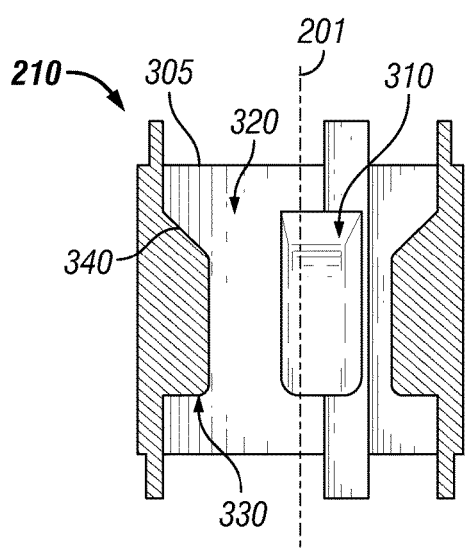
FIG. 3 illustrates a cross-sectional view and FIG. 4 illustrates an enlarged view of a first thrust frame in accordance with implementations of various techniques described herein.
Figure 4:
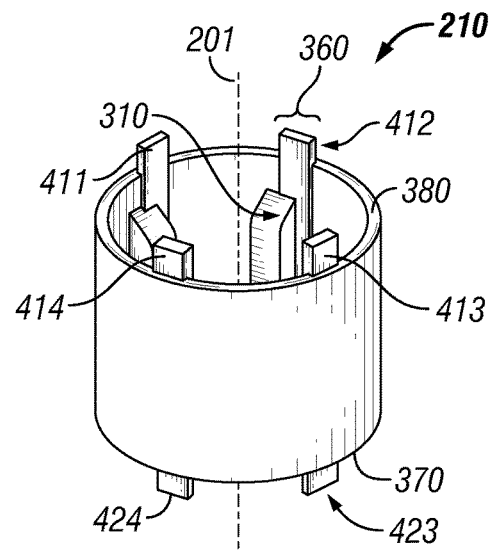
Figure 5:
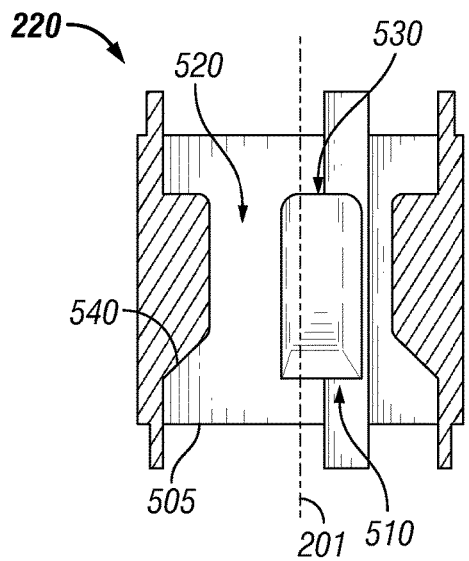
FIG. 5 illustrates a cross-sectional view and FIG. 6 illustrates an enlarged view of a second thrust frame in accordance with implementations of various techniques described herein.
Figure 6:
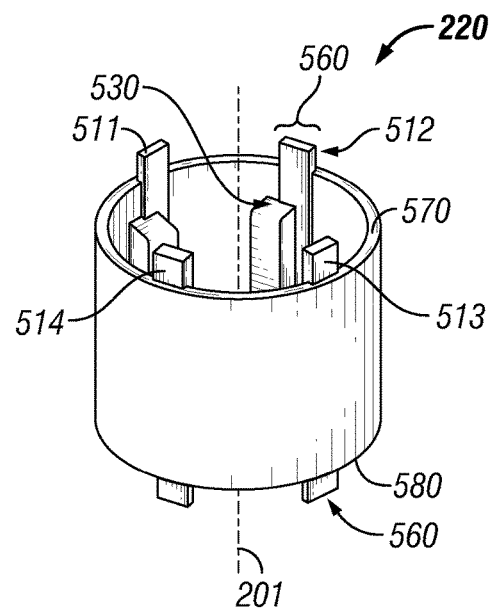
Figure 7:
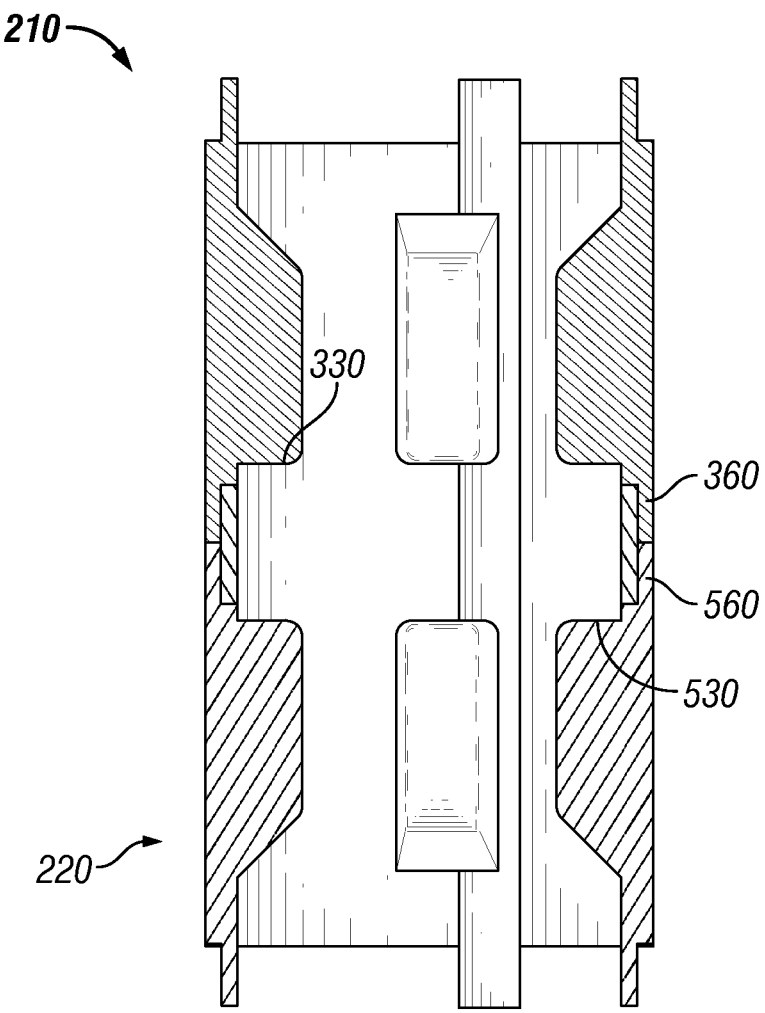
FIG. 7 illustrates a cross-sectional view of the first thrust frame coupled to the second thrust frame in accordance with implementations of various techniques described herein.

FIG. 3 illustrates a cross-sectional view and FIG. 4 illustrates an enlarged view of the first thrust frame 210 in accordance with implementations of various techniques described herein. FIG. 5 illustrates a cross-sectional view and FIG. 6 illustrates an enlarged view of the second thrust frame 220 in accordance with implementations of various techniques described herein. FIG. 7 illustrates a cross-sectional view of the first thrust frame 210 coupled to the second thrust frame 220 in accordance with implementations of various techniques described herein. The first thrust frame 210 and the second thrust frame 220 may be configured to be hollow such that the stationary thrust bearing 230, the rotating thrust bearing 260, the spacers 240 and 242, the spring mechanism 250, the rotor spacer 270, and/or the shaft 130 may be disposed within the first thrust frame 210 and the second thrust frame 220, as will be described later.

As shown in FIGS. 3 and 4, the first thrust frame 210 may have a generally cylindrical body with an inner surface 305 and openings at each end portion of the body. The first thrust frame 210 may include a plurality of flow diverters 310 protruding generally laterally from the inner surface 305 toward a longitudinal axis 201. In one implementation, the plurality of flow diverters 310 may be identical in size, shape and orientation. The plurality of flow diverters 310 may also be arranged equidistantly along the inner surface 305. In one implementation, the first thrust frame 210 may include at least three flow diverters 310.

In another implementation, each flow diverter 310 may run along the inner surface 305 in a manner that is parallel to the longitudinal axis 201, and have a flat end portion 330 and a sloped end portion 340. The flat end portion 330 may be relatively perpendicular to the inner surface 305. The sloped end portion 340 may be set at an angle relative to the inner surface 305, such as an angle between about 25 degrees to about 75 degrees. The end portion of the first thrust frame 210 proximate to the flat end portion 330 may be referred to as the seating end portion 370, and the end portion of the first thrust frame 210 proximate to the sloped end portion 340 may be referred to as the flowing end portion 380.

A plurality of flow ports 320 may be formed along the inner surface 305 of the first thrust frame 210, where each flow port may be formed (or defined) between a pair of adjacent flow diverters 310. The flow ports 320 may be identical in size, shape and orientation, and may be positioned equidistantly along the inner surface 305. The flow ports 320 may be configured to allow drilling fluid to flow between the flow diverters 310. For example, in a hydraulic thrust bearing arrangement, drilling fluid may be allowed to enter the flowing end portion 380 of the first thrust frame 210, flow through the plurality of flow ports 320, and exit the first thrust frame 210 at the seating end portion 370.

The first thrust frame 210 and the second thrust frame 220 may be identical to one another, i.e., identical in terms of construction, size, shape, and arrangement. In one implementation, the first thrust frame 210 and the second thrust frame 220 may be modularly designed. As shown in FIGS. 5 and 6, the second thrust frame 220 may similarly include an inner surface 505, a plurality of flow diverters 510, a plurality of flow ports 520, flat end portions 530, sloped end portions 540, a seating end portion 570 and a flowing end portion 580. In one implementation, the first thrust frame 210 and the second thrust frame 220 may both be composed of steel.

When coupled together in the thrust bearing assembly 140, the first thrust frame 210 and the second thrust frame 220 may be oriented in opposite directions with respect to one another. In particular, the frames may be coupled together at seating end portion 370 and seating end portion 570, as illustrated in FIG. 7. When coupled together, the flow ports 320 and 520 may be aligned such that drilling fluid may be generally unobstructed as it passes between the first thrust frame 210 and the second thrust frame 220. In such an implementation, the first thrust frame 210 may couple to a flowing end portion of another thrust frame via the flowing end portion 380. The second thrust frame 220 may also couple to a flowing end portion of yet another thrust frame via the flowing end portion 580. In another implementation, the first thrust frame 210 and the second thrust frame 220 may be coupled together at the flowing end portion 380 and the flowing end portion 580. In such an implementation, the first thrust frame 210 may couple to a seating end portion of another thrust frame via the seating end portion 370. The second thrust frame 220 may also couple to a seating end portion of yet another thrust frame via the seating end portion 570.

As shown in FIGS. 3-7, the first thrust frame 210 may use a plurality of alignment tabs 360 and the second thrust frame 220 may use a plurality of alignment tabs 560 to couple with each other. The alignment tabs 360 and 560 may engage with one another in order to prevent rotation of either the first thrust frame 210 or the second thrust frame 220 with respect to the other. The alignment tabs 360 and 560 may also be used to ensure proper alignment of flow ports between the first thrust frame 210 and the second thrust frame 220.

In one implementation, the first thrust frame 210 may have the alignment tabs 360 extending in an axial direction from the inner surface 305, such that alignment tabs 360 may protrude beyond both the seating end portion 370 and the flowing end portion 380. In particular, an outer diameter of the alignment tabs 360 may be less than an inner diameter of the seating end portion 370 and an inner diameter of the flowing end portion 380. An inner diameter of the alignment tabs 360 may be greater than an inner diameter of the flow diverters 310. In another implementation, at least four alignment tabs 360 may protrude beyond each of the seating end portion 370 and the flowing end portion 380. As shown in FIG. 4, for both the seating end portion 370 and the flowing end portion 380, each alignment tab 360 may be axially symmetric with another alignment tab 360 such that they may be positioned 180 degrees from one another. For example, alignment tab 411 may be symmetric to alignment tab 413, and alignment tab 412 may be symmetric to alignment tab 414. Accordingly, a circumferential length between alignment tabs 411 and 412 may be the same as a circumferential length between alignment tabs 413 and 414.

As shown in FIG. 4, these alignment tabs may be positioned such that this circumferential length may be shorter than either circumferential length between alignment tabs 411 and 414 or between alignment tabs 413 and 412.

In one implementation, the alignment tabs 360 may protrude beyond the flowing end portion 380 in the same pattern as they do beyond the seating end portion 370. Thus, the arrangement of alignment tabs 421 (not shown), 422 (not shown), 423 and 424 are the same as the arrangement of alignment tabs 411, 412, 413, and 414, respectively. In another implementation, the alignment tabs 360 may be positioned proximate to the flow diverters 310. In a further implementation, the alignment tabs 360 may generally extend in an axial direction from the flow diverters 310 and along the inner surface 305.

As mentioned above, the first thrust frame 210 and the second thrust frame 220 are modularly designed, such that the arrangement of alignment tabs 560 is identical to the arrangement of alignment tabs 360. Thus, the arrangement of alignment tabs 511, 512, 513 and 514 are the same as the arrangement of alignment tabs 421, 422, 423, and 424. Accordingly, when coupling the first thrust frame 210 and the second thrust frame 220, the pairs of alignment tabs extending beyond seating end portion 370 and separated by a shorter circumferential length may engage with the pairs of alignment tabs extending beyond seating end portion 570 and separated by a longer circumferential length. Conversely, the pairs of alignment tabs extending beyond the seating end portion 370 separated by a longer circumferential length may engage with the pairs of alignment tabs extending beyond the seating end portion 570 separated by a shorter circumferential length.

For example, a user may couple the first thrust frame 210 and the second thrust frame 220 by initially rotating the first thrust frame 210 about the longitudinal axis 201 until alignment tabs 424 and 423 may be positioned between alignment tabs 511 and 514. The user may then mate the two frames, such that alignment tab 424 laterally abuts alignment tab 511 and alignment tab 423 laterally abuts alignment tab 514. Once the alignment tabs extending beyond the seating end portion 370 and the seating end portion 570 are engaged via the lateral abutments, the user may further mate the first thrust frame 210 and the second thrust frame 220 such that the seating end portion 370 and the seating end portion 570 abut one another, thereby coupling the two frames. In another implementation, the first thrust frame 210 and the second thrust frame 220 may be similarly coupled at the flowing end portion 380 and the flowing end portion 580.

Once the alignment tabs 360 of the first thrust frame 210 engage the alignment tabs 560 of the second thrust frame 220 at one or more of the seating end portions or one or more of the flowing end portions, the first thrust frame 210 and the second thrust frame 220 may be prevented from rotating with respect to the other. In addition, as discussed earlier, when the first thrust frame 210 and the second thrust frame 220 are coupled together and when the alignment tabs 360 and 560 are engaged, the flow ports 320 and 520 may be aligned such that drilling fluid may be generally unobstructed as it passes between the first thrust frame 210 and the second thrust frame 220. In another implementation, the alignment tabs as disclosed herein may be used with various types of frames for a drilling tool.

Stationary Thrust Bearing

Figure 8:
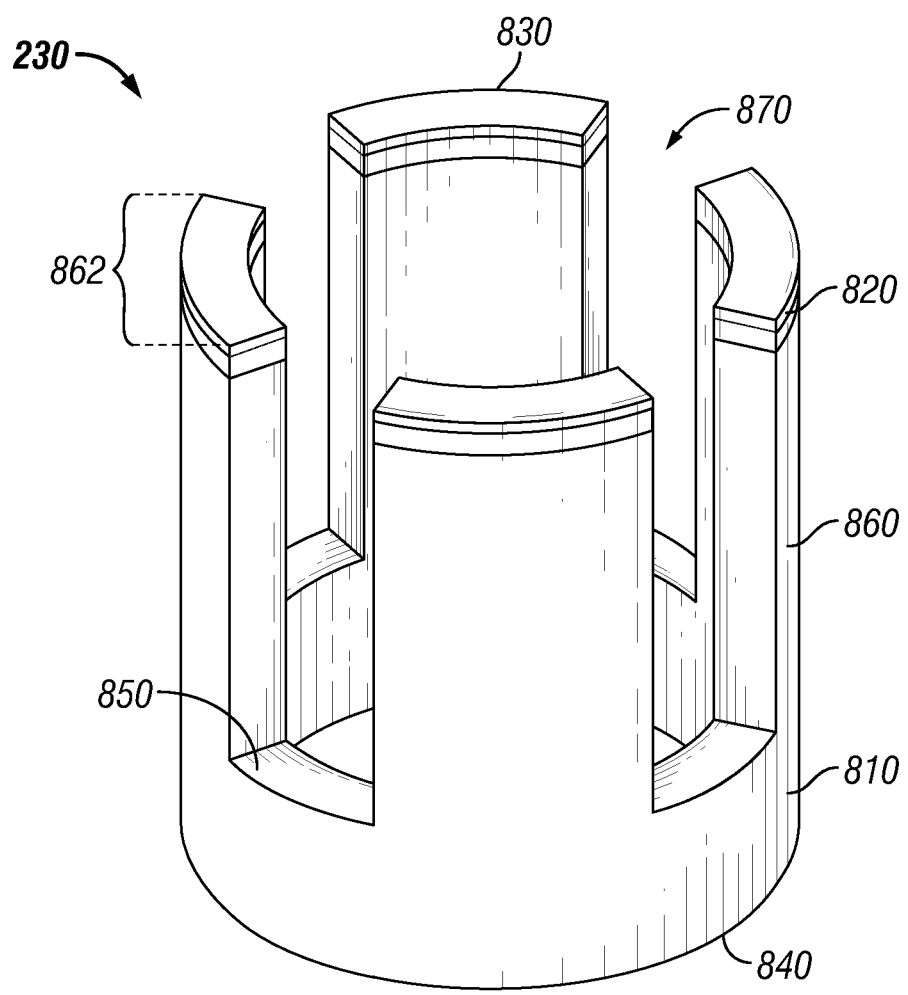
FIG. 8 illustrates an enlarged view of a stationary thrust bearing in accordance with implementations of various techniques described herein.

FIG. 8 illustrates an enlarged view of the stationary thrust bearing 230 in accordance with implementations of various techniques described herein. The stationary thrust bearing 230 may include a generally cylindrical base portion 810, a tungsten carbide substrate 820, a diamond table 830 and a plurality of legs 860. In one implementation, the legs 860 and the base portion 810 may be composed of steel. In another implementation, the base portion 810, the substrate 820, the table 830, and the legs 860 may be composed of the same material, such as steel, tungsten carbide, or any other implementation known to those skilled in the art. The stationary thrust bearing 230 may be configured to be hollow such that the rotor spacer 270 (FIG. 2) and/or the shaft 130 (FIG. 1) may be disposed within the stationary thrust bearing 230, as will be described later.

The base portion 810 may have openings at each end portion, and the legs 860 may be configured to extend in an axial direction from one end portion of the base portion 810, referred to as a mating end portion 850. In one implementation, the legs 860 may be identical in size, shape and orientation. The legs 860 may also be arranged equidistantly along the mating end portion 850. In one implementation, the stationary thrust bearing 230 may include at least two legs 860. In another implementation, a number of the legs 860 may be equal to the number of the flow ports 320 (FIG. 3) of the first thrust frame 210 (FIG. 3). A plurality of gaps 870 may be formed between the legs 860. Inner diameters of the base portion 810 and the legs 860 may be greater than an outer diameter of either the rotor spacer 270 (FIG. 2) or the shaft 130 (FIG. 1), such that the rotor spacer 270 and/or the shaft 130 may be disposed within the stationary thrust bearing 230.

Respective end portions 862 of the legs 860 may include a portion of the diamond table 830 and a portion of the tungsten carbide substrate 820, such that the tungsten carbide substrate 820 may be positioned between portions of the diamond table 830 and steel material of the legs 860. The diamond table 830 may include synthetic diamond materials.

Looking now at FIGS. 3 and 8, the stationary thrust bearing 230 may be positioned within the first thrust frame 210, such that the stationary thrust bearing 230 may be at least partially disposed in the first thrust frame 210 and the legs 860 may be configured to engage with the flow ports 320. In particular, rotation of the stationary thrust bearing 230 with respect to the first thrust frame 210 and the second thrust frame 220 (FIG. 5) may be prevented by frictional engagement of the legs 860 with the flow diverters 310. For example, the legs 860 may have approximately the same width as the flow ports 320. In addition, an outer diameter of the stationary thrust bearing 230 may be configured to be greater than the inner diameter of the flow diverters 310, such that rotation of the stationary thrust bearing 230 may be arrested by the flow diverters 310. In one implementation, an inner diameter of the stationary thrust bearing 230 may be approximately equal to the inner diameter of the flow diverters 310.

The outer diameter of the stationary thrust bearing 230 may be configured to be less than an inner diameter of the first thrust frame 210. Thus, when the stationary thrust bearing 230 is positioned within the first thrust frame 210, a plurality of flow paths may be defined by spaces in the flow ports 320 which are generally unobstructed by the legs 860, thereby allowing the drilling fluid to pass through the flow paths. In such an implementation, respective end portions 862 of the legs 860 may be positioned proximate to the sloped end portions 340 of the flow diverters 310. The sloped end portions 340 may help to direct drilling fluid to the portions of the diamond table 830 disposed on the legs 860. In such an implementation, the directed drilling fluid may help to cool the portions of the diamond table 830. The legs 860 may also extend in the axial direction to such an extent that the portions of the diamond table 830 may be positioned beyond the sloped end portions of the flow diverters 310, allowing the diamond table 830 to freely mate with a diamond table of a rotating bearing assembly, as discussed in more detail in the paragraphs below.

Upon engaging the legs 860 of the stationary thrust bearing 230 with the flow ports 320 of the first thrust frame 210, the mating side 850 may also engage with the one or more of the flat end portions 330 of the flow diverters 310. The base portion 810 may include a resting end portion 840, which lies on an opposite end portion to the mating end portion 850. In one implementation, the resting end portion 840 may be disposed on a combination of one or more spacers, such as spacers 240 and 242 (see FIG. 2), and/or one or more spring mechanisms 250 (see FIG. 2). The spring mechanisms 250 may include one or more coil springs, Belleville springs, machine springs, wave springs or any other spring mechanism known to those skilled in the art. The combination of spacers 240, 242 and spring mechanisms 250 may be disposed on the one or more flat end portions 530 of the flow diverters 510 of the second thrust frame 220. In this manner, the spacers and the spring mechanisms 250 may be disposed inside the second thrust frame 220. Such a configuration may allow for some axial movement by the stationary thrust bearing 230. In one implementation, the stationary thrust bearing 230 may be at least partially positioned within the second thrust frame 220.

Rotating Thrust Bearing

Figure 9:
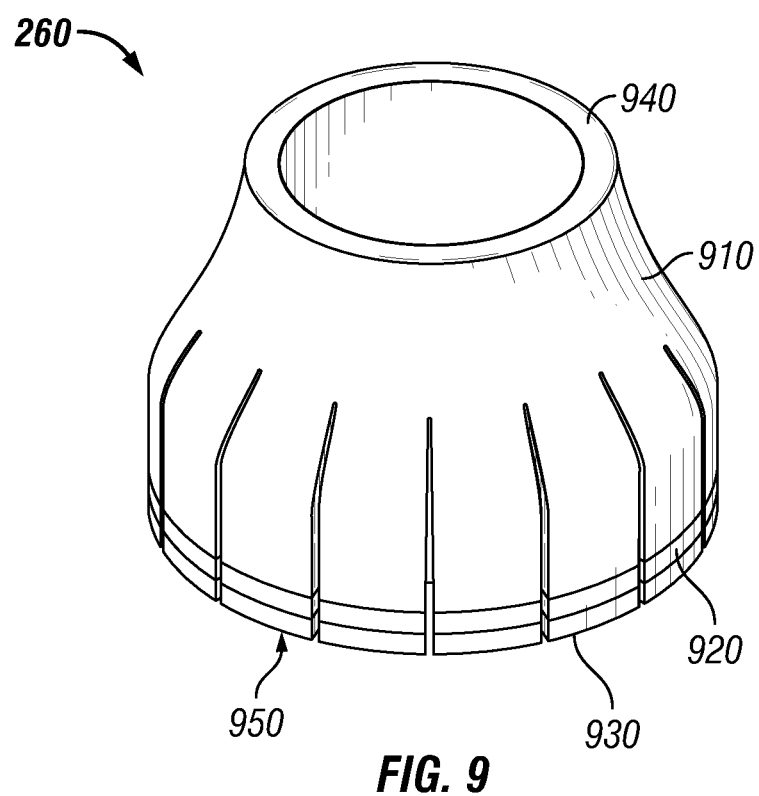
FIG. 9 illustrates an enlarged view of a rotating thrust bearing in accordance with implementations of various techniques described herein.
Figure 10:
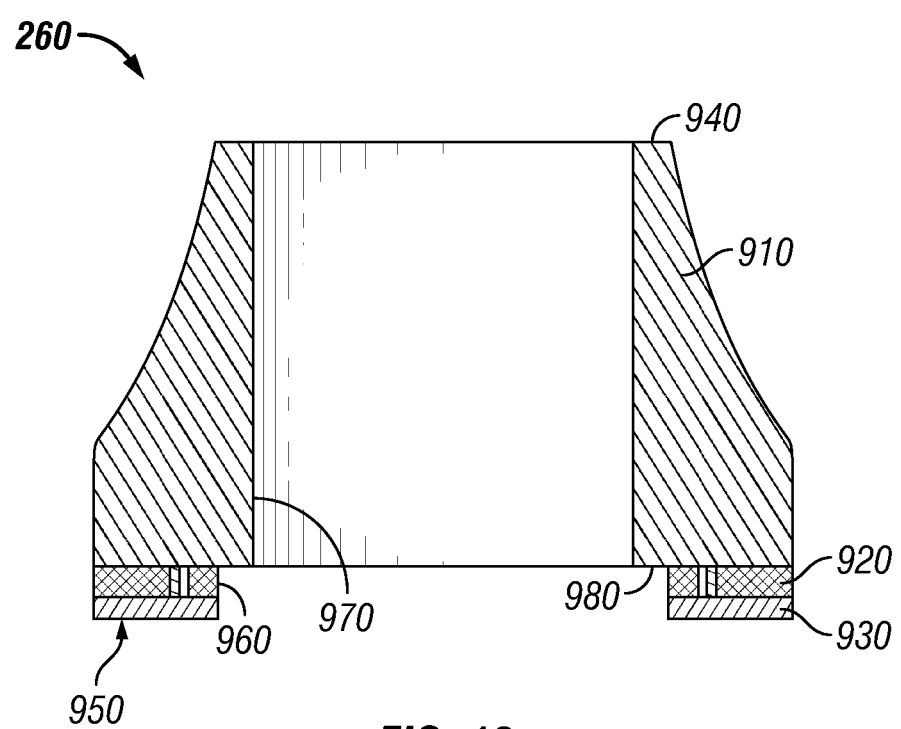
FIG. 10 illustrates a cross-sectional view of a rotating thrust bearing in accordance with implementations of various techniques described herein.

FIG. 9 illustrates an enlarged view and FIG. 10 illustrates a cross-sectional view of the rotating thrust bearing 260 in accordance with implementations of various techniques described herein. The rotating thrust bearing 260 may include a body portion 910, a tungsten carbide substrate 920 and a diamond table 930. In one implementation, the body portion 910 may composed of steel. In another implementation, the body portion 910, the substrate 920, and the table 930 may be composed of the same material, such as steel, tungsten carbide, or any other implementation known to those skilled in the art. The rotating thrust bearing 260 may be configured to be hollow such that the shaft 130 may be disposed within the rotating thrust bearing 260, as will be described later.

The rotating thrust bearing 260 may be configured such that the body portion 910 may be coupled to the tungsten carbide substrate 920, and the tungsten carbide substrate 920 may be coupled to the diamond table 930. The diamond table 930 may include synthetic diamond materials. The rotating thrust bearing 260 may also include one or more electrical discharge machining (EDM) cuts along the body portion 910, the tungsten carbide substrate and/or the diamond table 930 to facilitate the flow of drilling fluid for the purpose of cooling the rotating thrust bearing 260 and the stationary thrust bearing 230.

The rotating thrust bearing 260 may have a first end portion 940 and a second end portion 950, with openings at each end portion. In one implementation, the first end portion 940 has an outer diameter that is less than an outer diameter of the second end portion 950. The second end portion 950 may be composed of the diamond table 930. In such an implementation, the body portion 910 may be parabolically curved, as shown in FIG. 9, from the first end portion 940 to where the body portion 910 meets the tungsten carbide substrate 920 in order to facilitate the flow of drilling fluid around the rotating thrust bearing 260.

As shown in FIG. 10, the rotating thrust bearing 260 may include a first inner diameter 960 and a second inner diameter 970. The first inner diameter 960 may be greater than the second inner diameter 970. The first inner diameter 960 may be formed by the combined inner diameters of the tungsten carbide substrate 920 and the diamond table 930, including the second end portion 950. The second inner diameter 970 may be formed by an inner diameter of the body portion 910, such that a step 980 of the body portion 910 may protrude beyond the first inner diameter 960 when the rotating thrust bearing 260 is fully assembled. The second inner diameter 970 may be greater than the outer diameter of the shaft 130 (not shown).

In operation, as discussed earlier with respect to FIG. 2, the rotating thrust bearing 260 and the rotor spacer 270 may be coupled or mounted to the shaft 130 (not shown) via rotor compression, such that the rotating thrust bearing 260, the rotor spacer 270, and the shaft 130 may rotate together. The shaft 130 may pass through the rotating thrust bearing 260, as the outer diameter of the shaft 130 is less than the second inner diameter 970. Rotor components, such as the rotor spacer 270, may come into contact with the step 980, while avoiding contact with the diamond table 930. Such a configuration allows the rotor compression to be applied to the body portion 910, while avoiding the application of rotor compression to the diamond table 930.

Further, the rotating thrust bearing 260 may be at least partially positioned within the first thrust frame 210, such that the diamond table 930 may mate with the diamond table 830 of the stationary thrust bearing 230. While the stationary thrust bearing 230 may not rotate with respect to the first thrust frame 210 and the second thrust frame 220, the rotating thrust bearing 260 may rotate with respect to the frames via the movement of the shaft 130. During the rotation of the rotating thrust bearing 260, the diamond table 930 may rotate against the diamond table 830.

In another implementation, the rotating thrust bearing 260 may be a diamond disc configured to accept compression as a result of thrust from the turbodrill 100. The diamond disc may be composed of synthetic diamond. In addition, the diamond disc may be configured to mate with the diamond table 830 of the stationary thrust bearing 230 and may be at least partially positioned within the first thrust frame 210. The diamond disc may also be configured be coupled or mounted to the shaft 130 (not shown) via rotor compression, such that the diamond disc may rotate against the diamond table 830 when the shaft 130 rotates.

Figure 11:
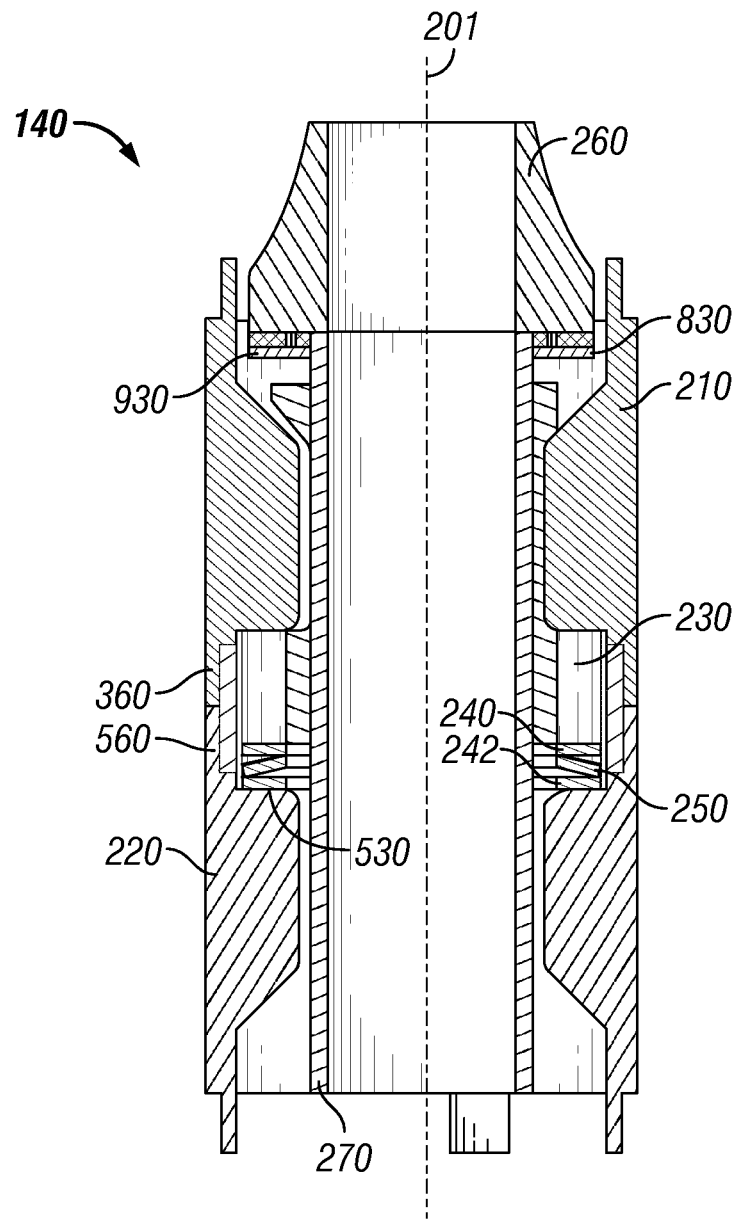
FIG. 11 illustrates a cross-sectional view of a thrust bearing assembly in accordance with implementations of various techniques described herein.

FIG. 11 illustrates a cross-sectional view of the thrust bearing assembly 140 in accordance with implementations of various techniques described herein. As shown, the first thrust frame 210 may be coupled to the second thrust frame 220 via alignment tabs 360 and 560. The diamond table 930 of the rotating thrust bearing 260 may be mated to the diamond table 830 of the stationary thrust bearing 230. The rotating thrust bearing 260 may be at least partially positioned within the first thrust frame 210. The stationary thrust bearing 230 may be disposed on a combination of one or more spacers, such as spacers 240 and 242, and/or one or more spring mechanisms 250. The combination of spacers 240, 242 and spring mechanisms 250 may be disposed on the one or more flat end portions 530 of the flow diverters 510 of the second thrust frame 220. The rotating thrust bearing 260 and the rotor spacer 270 may be coupled or mounted to the shaft 130 (not shown) via rotor compression.

Figure 12:
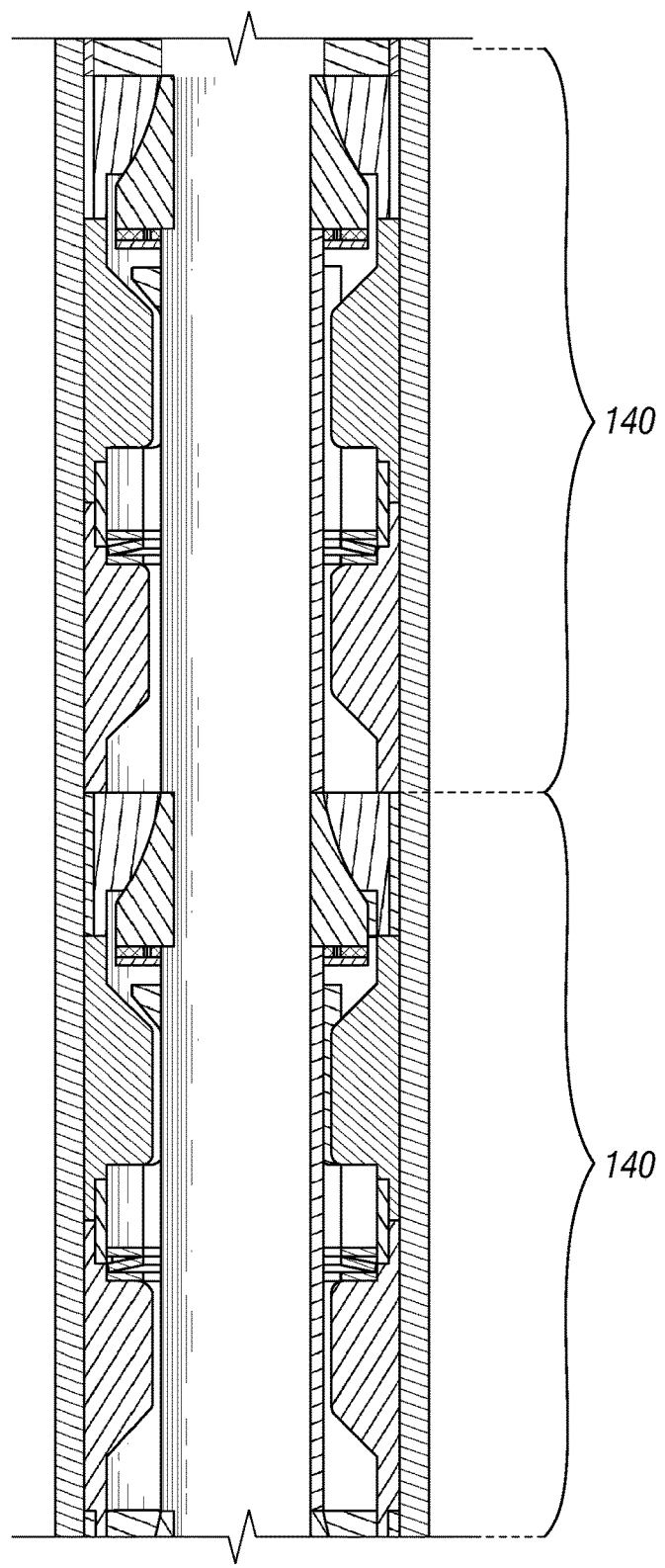
FIG. 12 illustrates a cross-sectional view of multiple thrust bearing assemblies in accordance with implementations of various techniques described herein.

FIG. 12 illustrates a cross-sectional view of multiple thrust bearing assemblies 140 in accordance with implementations of various techniques described herein. As shown, each thrust bearing assembly is coupled to the other thrust bearing assembly via respective flowing end portions of their thrust frames. As shown, each thrust bearing assembly 140 may be used as hydraulic thrust bearings, mechanical thrust bearings, or a combination of both hydraulic and mechanical thrust bearings. In one implementation, either one of the shown thrust bearing assemblies 140 may be turned upside-down to have a hydraulic thrust bearing assembly coupled to a mechanical thrust bearing assembly.

In one implementation, in operation, the thrust bearing assembly 140 may dampen thrust generated by the turbodrill 100. For example, as illustrated in FIGS. 9 and 10, a rotational force provided to the shaft 130 may cause the rotating thrust bearing 260 and the rotor spacer 270 to also rotate, such that the diamond table of the rotating thrust bearing 260 may rotate while the diamond table 830 remains stationary with respect to the first thrust frame 210 and the second thrust frame 220. The thrust generated by rotor components of the turbodrill 100, such as by the turbine stages 120, may be transferred to the rotating thrust bearing 260 from the shaft 130. The thrust may be transferred to the stationary thrust bearing 230 from the rotating thrust bearing 260.

The stationary thrust bearing 260 may then transfer the thrust to the first thrust frame 210 due to the frictional engagement of the legs 860 with the flow diverters 310. The stationary thrust bearing 260 may also transfer the thrust to the second thrust frame 220 via the spacers 240, 242 and/or the spring mechanisms 245. The housing 110 may ultimately receive the thrust, as both the first thrust frame 210 and the second thrust frame 220 are frictionally engaged to an inner wall or surface of the housing 110 through stator compression. Consequently, the thrust bearing assembly may help protect the shaft 130 from taking a full amount of the thrust by transferring the thrust to the housing 110.

In sum, various implementations described above with respect to FIGS. 1-12 may allow for mitigating excess thrust in a drilling tool using a cost-efficient thrust bearing assembly design. Holding the stationary thrust bearing in a stationary position relative to housing using frictional engagement with steel thrust frames, as opposed to pins, may lead to an increased use for the thrust bearing assembly. Such a configuration may also accommodate certain space limitations associated with slim hole drilling tools. In addition, alignment of flow ports across multiple thrust frames, such as through use of alignment tabs, may lessen erosion within the drilling tool and improve lifespan of the thrust bearing assembly. For example, the diamond tables of the rotating thrust bearing and the stationary thrust bearing may experience less wear due to improved circulation of drilling fluid. Further, use of a modular design for the thrust frames, such that they may be interchangeable in one or more positions, may help reduce costs associated with manufacturing and/or inventory upkeep.

While the foregoing is directed to implementations of various techniques described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A thrust bearing assembly for use in a drilling tool, comprising:
a first thrust frame having a generally cylindrical hollow body with a first inner surface, wherein the first thrust frame comprises (i) a plurality of first flow diverters protruding laterally from the first inner surface toward a central longitudinal axis of the thrust bearing assembly and (ii) a plurality of first flow ports formed along the first inner surface between adjacent first flow diverters; and
a stationary thrust bearing having a generally cylindrical base with a plurality of legs extending in an axial direction from the base, wherein the plurality of legs are configured to be generally positioned within the plurality of first flow ports.

2. The thrust bearing assembly of claim 1, further comprising:
a second thrust frame having a generally cylindrical hollow body with a second inner surface and coupled to the first thrust frame, wherein the second thrust frame comprises (i) a plurality of second flow diverters protruding laterally from the second inner surface toward the central longitudinal axis and (ii) a plurality of second flow ports formed along the second inner surface between adjacent second flow diverters, wherein the stationary thrust bearing is positioned inside the first thrust frame and the second thrust frame.

3. The thrust bearing assembly of claim 2, wherein the plurality of second flow diverters include a flat end and wherein a resting end portion of the generally cylindrical base of the stationary thrust bearing is configured to rest on the respective flat end portions of the plurality of second flow diverters.

4. The thrust bearing assembly of claim 3, wherein one or more springs, one or more spacers, or combinations thereof are disposed between the resting end portion of the stationary thrust bearing and the respective flat end portions of the plurality of second flow diverters.

5. The thrust bearing assembly of claim 1, wherein the plurality of legs are generally positioned within the plurality of first flow ports in such a way as to form a plurality of flow paths in the first thrust frame.

6. The thrust bearing assembly of claim 5, wherein an outer diameter of the stationary thrust bearing is greater than an inner diameter of the plurality of first flow diverters and less than an inner diameter of the first inner surface.

7. The thrust bearing assembly of claim 5, wherein the first thrust frame is coupled to the second thrust frame such that the plurality of flow paths is aligned with the plurality of second flow ports.

8. The thrust bearing assembly of claim 1, wherein respective end portions of the plurality of legs comprise respective portions of a diamond table.

9. The thrust bearing assembly of claim 8, wherein the plurality of first flow diverters include sloped end portions and wherein the respective sloped end portions of the plurality of first flow diverters are positioned proximate to the diamond table.

10. The thrust bearing assembly of claim 1, wherein the plurality of legs are frictionally engaged with the plurality of first flow diverters such that the stationary thrust bearing is prevented from rotating with respect to the first thrust frame.

11. The thrust bearing assembly of claim 1, wherein the plurality of legs of the stationary thrust bearing extend from a mating end portion of the base and respective end portions of the first plurality of flow diverters are configured to engage with the mating end portion when the plurality of legs are generally positioned within the first plurality of flow ports.

12. A frame assembly for use in a drilling tool, comprising:
 a first frame having a generally cylindrical hollow body with a first inner surface, a first end portion, and a second end portion, the first frame includes (i) a plurality of first flow diverters protruding laterally from the first inner surface toward a central longitudinal axis of the first frame, (ii) a plurality of first flow ports formed along the first inner surface between adjacent first flow diverters, (iii) a plurality of first alignment tabs arranged in a predetermined arrangement and protruding in an axial direction beyond the first end portion, and (iv) a plurality of second alignment tabs arranged in the predetermined arrangement and protruding in the axial direction beyond the second end portion;
 a second frame having a generally cylindrical hollow body with a third end portion and a fourth end portion, a plurality of third alignment tabs arranged in the predetermined arrangement and protruding in an axial direction beyond the third end portion, and a plurality of fourth alignment tabs arranged in the predetermined arrangement and protruding in the axial direction beyond the fourth end portion;
 wherein the first alignment tabs are configured to couple with the third alignment tabs or the fourth alignment tabs; and
 wherein the second alignment tabs are configured to couple with the third alignment tabs or the fourth alignment tabs.

13. The frame assembly of claim 12, wherein the third alignment tabs are configured to couple with the first alignment tabs or the second alignment tabs; and
 wherein the fourth alignment tabs are configured to couple with the first alignment tabs or the second alignment tabs.

14. The frame assembly of claim 12, wherein each alignment tab is axially symmetric from a corresponding alignment tab on the same end portion.

15. The frame assembly of claim 12, wherein pairs of the first alignment tabs having a shorter circumferential length are configured to engage with pairs of the third alignment tabs or pairs of the fourth alignment tabs having a longer circumferential length.

16. A turbodrill, comprising:
 a housing having a bore extending therethrough;
 a rotatable shaft positioned in the housing bore, wherein the shaft is rotatable relative to the housing, and wherein the housing, the housing bore and the rotatable shaft have a common central longitudinal axis; and
 a hydraulic thrust bearing assembly configured to allow the rotatable shaft to pass therethrough, comprising:
  a first thrust frame having a generally cylindrical hollow body with a first inner surface, wherein the first thrust frame comprises (i) a plurality of first flow diverters protruding laterally from the first inner surface toward the common central longitudinal axis of the thrust bearing assembly and (ii) a plurality of first flow ports formed along the first inner surface between adjacent first flow diverters;
  a stationary thrust bearing having a generally cylindrical base with a plurality of legs extending in an axial direction from the base, wherein the plurality of legs are configured to be generally positioned within the plurality of first flow ports;
  a second thrust frame having a generally cylindrical hollow body with a second inner surface and coupled to the first thrust frame, wherein the second thrust frame comprises (i) a plurality of second flow diverters protruding laterally from the second inner surface toward the common central longitudinal axis and (ii) a plurality of second flow ports formed along the second inner surface between adjacent second flow diverters, wherein the stationary thrust bearing is positioned inside the first thrust frame and the second thrust frame; and
  a rotating thrust bearing rotatably coupled to the shaft and disposed on the plurality of legs of the stationary thrust bearing.

17. The turbodrill of claim 16, wherein a diamond table of the rotating thrust bearing is configured to mate with a diamond table of the stationary thrust bearing.

18. The turbodrill of claim 16, wherein the rotating thrust bearing comprises a diamond disc configured be coupled to the shaft via rotor compression.

19. The turbodrill of claim 16, wherein the plurality of legs are generally positioned within the plurality of first flow ports in such a way as to form a plurality of flow paths in the first thrust frame.

20. The turbodrill of claim 19, wherein the first thrust frame is coupled to the second thrust frame such that the plurality of flow paths is aligned with the plurality of second flow ports.

\* \* \* \* \*